United States Patent
Benezra (10) Patent No.: US 10,800,524 B2
(45) Date of Patent: Oct. 13, 2020

(54) SCALABLE DRONE LAUNCHER

(71) Applicant: Moshe Benezra, Jersey City, NJ (US)

(72) Inventor: Moshe Benezra, Jersey City, NJ (US)

(*) Notice: Subject to any disclaimer, the term of this patent is extended or adjusted under 35 U.S.C. 154(b) by 36 days.

(21) Appl. No.: 16/231,487

(22) Filed: Dec. 22, 2018

(65) Prior Publication Data

US 2020/0003529 A1 Jan. 2, 2020

Related U.S. Application Data

(60) Provisional application No. 62/610,191, filed on Dec. 23, 2017.

(51) Int. Cl.
*B64C 39/02* (2006.01)
*B64F 1/22* (2006.01)
*F41H 11/02* (2006.01)

(52) U.S. Cl.
CPC .......... *B64C 39/024* (2013.01); *B64C 39/028* (2013.01); *B64F 1/222* (2013.01); *B64C 2201/08* (2013.01); *B64C 2201/088* (2013.01); *B64C 2201/12* (2013.01); *B64C 2201/20* (2013.01); *B64C 2201/201* (2013.01); *F41H 11/02* (2013.01)

(58) Field of Classification Search
CPC .......... B64C 2201/08; B64C 2201/088; B64C 2201/20; B64C 2201/201; B64C 39/024; B64C 39/028; B64F 1/222; F41H 11/02
See application file for complete search history.

(56) References Cited

U.S. PATENT DOCUMENTS

| | | | |
|---|---|---|---|
| 8,899,903 B1* | 12/2014 | Saad | B65G 67/00 414/392 |
| 9,238,414 B2* | 1/2016 | Ryberg | B60L 53/80 |
| 9,387,928 B1* | 7/2016 | Gentry | G08G 5/0039 |
| 9,527,605 B1* | 12/2016 | Gentry | B64F 1/12 |
| 9,688,402 B2* | 6/2017 | Cheatham, III | G06Q 20/145 |
| 9,845,165 B2* | 12/2017 | Michalski | B64C 39/024 |
| 10,007,272 B2* | 6/2018 | Tirpak | G05D 1/0676 |
| 10,322,820 B2* | 6/2019 | Husain | B60L 53/30 |
| 10,370,122 B2* | 8/2019 | Fisher | B60L 53/00 |
| 10,625,859 B2* | 4/2020 | Beckman | B61L 25/025 |
| 10,723,483 B2* | 7/2020 | Priest | B64C 39/024 |
| 2016/0364989 A1* | 12/2016 | Speasl | G06Q 10/08 |
| 2017/0225802 A1* | 8/2017 | Lussier | B60L 53/36 |
| 2017/0275024 A1* | 9/2017 | Bennett | B64F 1/007 |
| 2018/0086483 A1* | 3/2018 | Priest | B64F 1/22 |
| 2018/0237161 A1* | 8/2018 | Minnick | B64F 1/007 |
| 2018/0245365 A1* | 8/2018 | Wankewycz | B64C 39/024 |
| 2018/0362188 A1* | 12/2018 | Achtelik | B60L 53/66 |

(Continued)

FOREIGN PATENT DOCUMENTS

WO WO-2018195574 A1 * 11/2018 ............ B64C 39/024

*Primary Examiner* — John Villecco (57) ABSTRACT

A method and apparatus for scalable and fast deployment of drones are presented. The method is based on packing multiple drones within a cell structure that provides means for changing, communication and fast deployment of drones as well as environmental protection. Multiple cells can be combined the further scale up the number and rate of drones being deployed. In a preferable arrangement, individual drones are equipped with special contacts that allow them to connect to the cell and optionally with other drones for power supply, diagnostic and communication.

2 Claims, 6 Drawing Sheets

(56) References Cited

U.S. PATENT DOCUMENTS

| | | | |
|---|---|---|---|
| 2019/0016476 A1* | 1/2019 | Scherz | B64F 1/364 |
| 2019/0077519 A1* | 3/2019 | Husain | B64F 1/222 |
| 2019/0245365 A1* | 8/2019 | Farrahi Moghaddam | H02J 50/12 |
| 2019/0270526 A1* | 9/2019 | Hehn | B64F 1/362 |
| 2019/0276147 A1* | 9/2019 | Lee | B64F 1/02 |
| 2019/0308724 A1* | 10/2019 | Cooper | B64F 1/222 |
| 2019/0367185 A1* | 12/2019 | Zambelli | E04H 6/44 |
| 2019/0383052 A1* | 12/2019 | Blake | B60L 53/12 |
| 2020/0189734 A1* | 6/2020 | Hortner | G05D 1/104 |

* cited by examiner

SCALABLE DRONE LAUNCHER

RELATED APPLICATIONS

This application is a non-provisional of and claims the benefit of the filing date of U.S. Provisional Patent Application No. 62/610,191 filed Dec. 23, 2017, the entire disclosure of which is herein incorporated by reference.

FILED OF TECHNOLOGY

The present invention is related, but not limited to, to the engagement of Unmanned Aerial Vehicles (UAV, or drones) at scale using interceptor drones.

The present invention is especially useful when it is required to deploy a defense grid quickly or to be able to launch many drones to engage a swarm of drones.

The present invention can be used from the ground, or mobile vehicles or ships.

Examples include but not limited to: (i) protecting border lines from illegal trafficking of drugs or firearms. (ii) protecting events or venues of temporary nature such as sport and cultural events. (iii) Protecting mobile troops in the field.

BACKGROUND

The fast development of Drone and Drone related applications carries with it various risks including: (i) Invasion of privacy—paparazzi, (ii) Risks to civil aviation at or near airports, (iii) Illegal arm or drug trafficking across borders or into prisons, (iv) Armed, or suicide drone used as a weapon against crowed (terrorism) or for targeted assassination, (v) Risks to sensitive infrastructure facilities—such as power grid transformers, (vi) Risk to sensitive industrial plants (hazmat chemical plant for example), (vii) Corporate espionage, and (viii) Risks to crowded venues—such as sports stadiums.

Different methods have been proposed for the engagement of unauthorized drones. The most common means of drone engagement include: (i) Jamming the GPS and Remote Control channel, which cause most commercial drones to enter a fail-safe mode and try to land safely. (ii) Capture the drone by a net. The net can be thrown by a hand-held net-gun; shoot by a net-canon, or be thrown by an intercepting drone. (iii) Shooting the drone down using firearm or high power laser (used mostly by the military)

Less conventional methods include capturing the drone using trained birds of prey. This approached proved to be difficult due to the cost and time needed for training and keeping the birds of prey as well as concerns regarding cruelty to animals.

The risk related to drones significantly increases when drones are flown autonomously, without the need for radio controlled operation using GPS, camera (SLAM) or both (Code for autonomously flying of drones is readily available, for example on GitHub) or when drones are flown at high altitude (common commercial drones can reach an altitude of 10,000 feet and above).

Autonomous drones flying at this height and above the clouds are not vulnerable to jamming and are out of range for most firearm, lasers, and all net canons.

A Missile can take down a drone at 10,000 feet. However, using missiles to take down drones is very costly and a very unfavorable solution in urban areas.

A human-crewed helicopter can also be used to take down drones. However, response time is relatively long.

Furthermore, a terrorist organization or drug cartel, are unlikely to send a single drone, but more likely send dozens of drone at once—some of which may only be a decoy.

A possible solution to the above problems would be the use of interceptor drones that are capable of seeking, intercepting and engaging unauthorized drones, for example using a net with a parachute. Drone interceptors provide a low-cost, versatile and effective solution to threats caused by unauthorized drones.

However, current systems that are typically aimed at the occasional unauthorized drones that are flown by reckless amateurs at a no-flight zone can only launch a single drone and are incapable of addressing a threat at scale.

What is needed is a method and an apparatus that enable keeping a relatively large number if interceptor drones in a hot and ready-to-launch state, protect them from the environment, and quickly launch them when needed at scale.

OBJECTS

It is an object of this invention to:
1. Keep a potentially large number of drone in a "ready to launch" state for a potentially long period.
2. Allow quick launch of a large number of drones.
3. Allow communication with individual drones before launch (for example feeding target coordinates, turning the engines, getting diagnostics)
4. Allow launching of specific drone when not all drones are identical (for example, carrying a different payload)

BRIEF DESCRIPTION OF THE DRAWINGS

For a more complete understanding of the invention, reference is made to the following description and accompanying drawings, in which.

DETAILED DESCRIPTION

In one realization of the invention, drones are stacked one on top of the other, where each drone is equipped with matching magnetic or mechanical and electrical contact at the bottom of the drone (legs) and the top of the drone (body of the drone, or motor arms).

Figure 1:
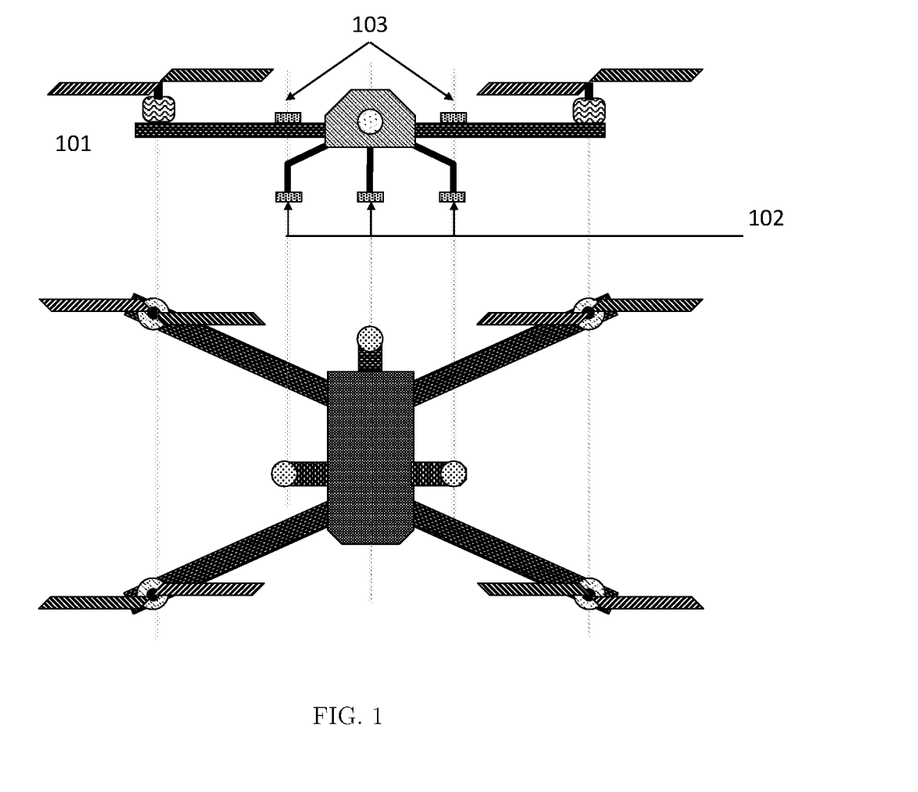
FIG. 1 Single Drone with top and bottom connectors.

FIG. 1 shows a schematic diagram of drone (101) having bottom contacts (102) on the legs that match the top contacts (103) of a second drone.

Said contact provides mechanical support as well as an electrical connection that is used to: (i) Provide power to the drone to charge its battery and operate its electronic systems (when the drone is in a standby mode). (ii) Communicate information such as initial target coordinates and target identification information to the drone before launch. (iii) Collect information such as system status and diagnostics from the drone. (iv) Operate the drone (for example: turn on engines, activate sensors, take-off, initiate wireless communication), and (v) Operate the drone to contacts, for example, operate an electromagnetic lock and release, or a mechanical latch.

Said contacts would typically have a mechanic or an electromagnetic hold mechanism to keep the drones steady through shake and vibration that systems must endure during transportation or when mounted on a moving vehicle or ship.

The use of permanent magnets is possible for the contacts but is limited by the power needed to break free.

Electromagnetic contacts are preferred because the can provide a much stronger holding power and release it just before the drone is launched.

Moreover, a combination of a permanent magnet contact on one size and electromagnetic contact on the other side or two electromagnetic contacts can provide an initial push to the departing drone by reversing the polarity in one of the contacts resulting with a more robust departing mechanism.

A permanent magnet also provides some holding power in case of a malfunction of the electromagnetic contact. Alternatively, the electromagnetic contact can be used to release the drone from an otherwise locked state (for example using a spring). In this case, the two droned are locked together in case of a malfunction.

Figure 6:
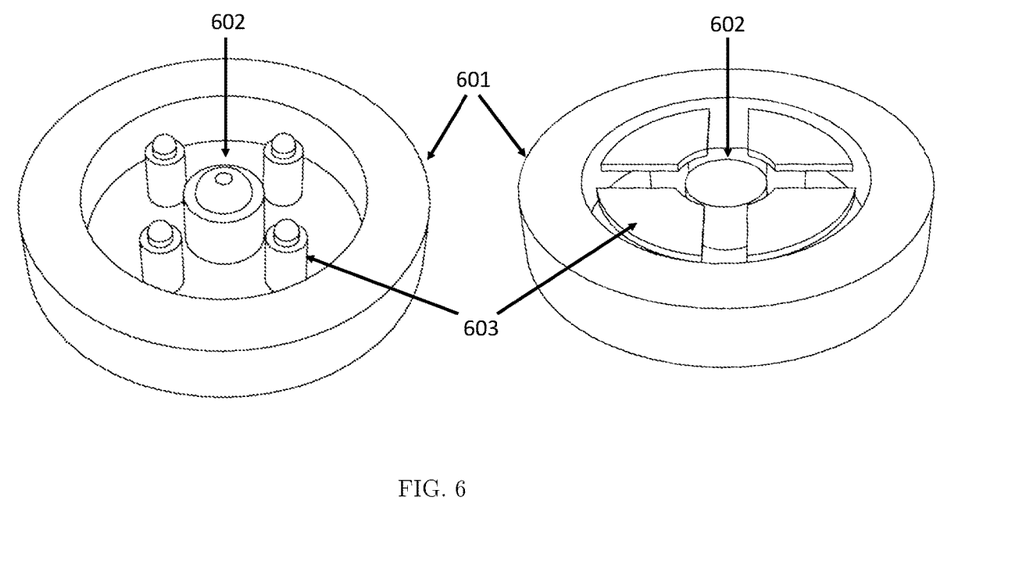
FIG. 6 An example of a contact pair.

An example of a matching contact pair is shown in FIG. 6. The magnetic ring pair (601) provides the physical holding force and can also serve as the ground (−) connector. Piston push connectors and plate (602, 603) can transfer electrical power (+) and data communication.

Figure 2:
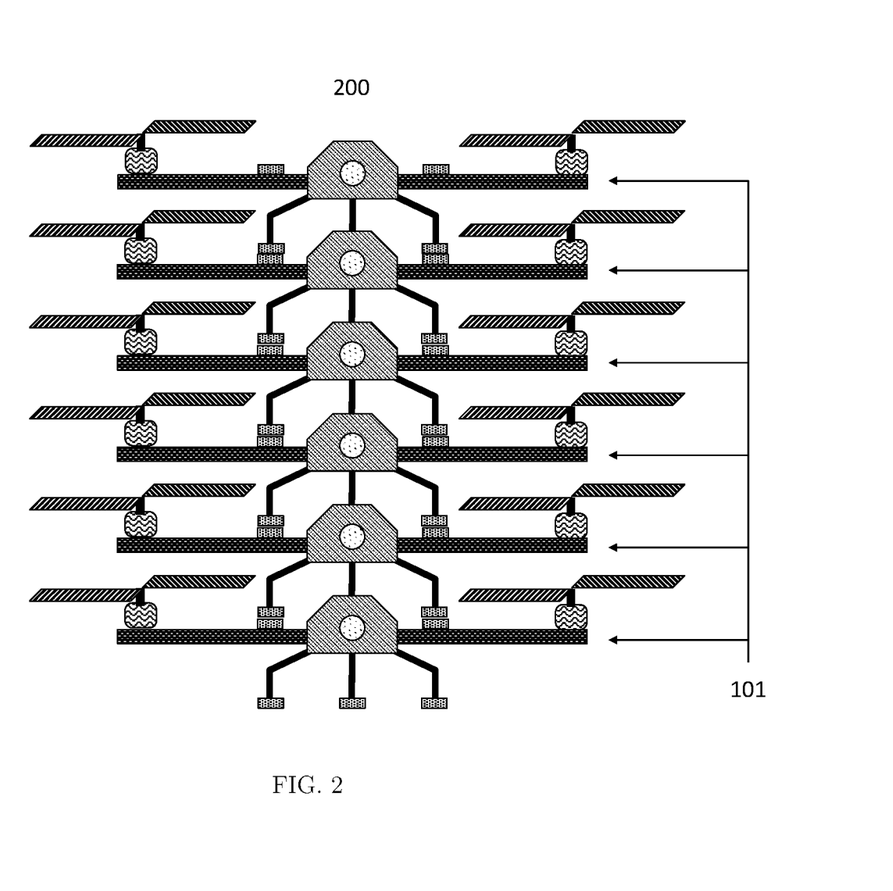
FIG. 2 A stack of drones connected to each other via the top and bottom connectors.

FIG. 2 shows an example six such (101) drones that are stacked one on top of the other. The contacts provide a bus or relay power and information across all drone in the stack (200).

The drone stack can be placed inside a closed cell that: (i) Protects the drones from environmental conditions such as weather, dust, extreme temperature, electromagnetic interference, and vibrations. (ii) Provides power and charge all drones' batteries and keep them in a ready-to-fly mode. (iii) Monitors the readiness of all drones. (iv) Provides command and communication functions from a control center to the drone stack and vice versa. (v) Launches the drones when needed.

Figure 3:
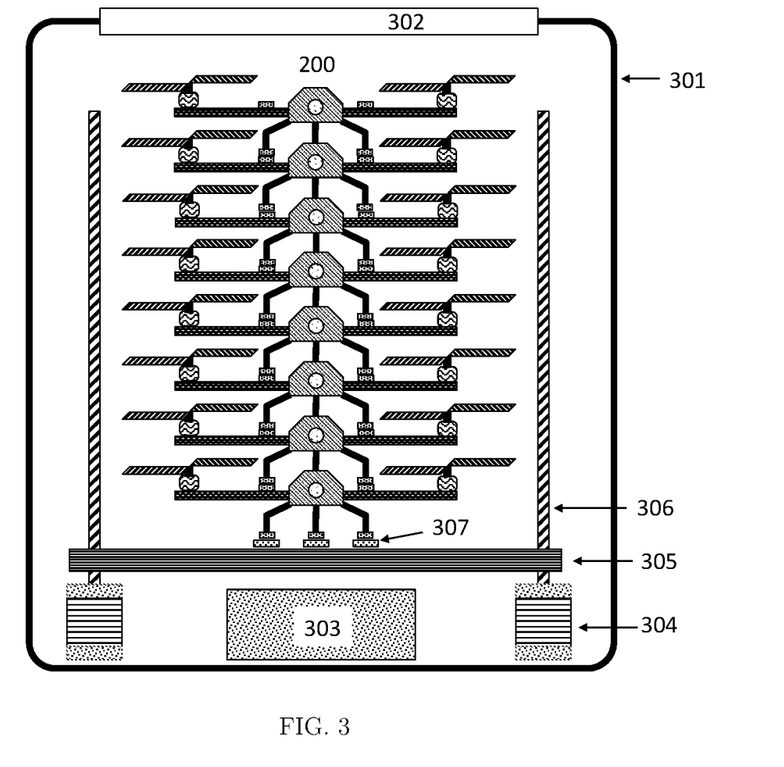
FIG. 3 Multi-drone drone launcher, stack arrangement.

The cell has a door (302) that is opened by a separate mechanism, for example, a motor, or pyrotechnic charges, or it can be pushed open when the elevator (305) is moving up pushing it open using an arm.

FIG. 3 shows an example of a cell. In this example, the cell comprises an enclosure (301), a door (302) that is opened before launch, a controller (303) that is responsible for the operation of the cell and drones and communication with the control center. In this example, the drone stack is connected to a platform (305), which has its own top contact set (307) that is connected to the bottom-most drone's bottom contact (102). In this case, the platform (305) can be elevated during launch by motors (304) and screws (306) thus bringing each drone to its launch position at the opened door (302).

The cell is connected to a power source, either a battery, a generator or external power source (grid line, or vehicle or ship power), and communication line or wireless connection with a control center.

Before launch, the controller feeds the necessary information to each drone.

After engines start, drones are released by turning off the electromagnet contact or reverse the polarity of one of the contacts.

A malfunctioning drone can be cleared away either by a reverse polarity pulse to the electromagnetic contacts or lifted away by the drone below it (or above it, depending on the exact setting of magnetic/electromagnetic contacts).

Figure 4:
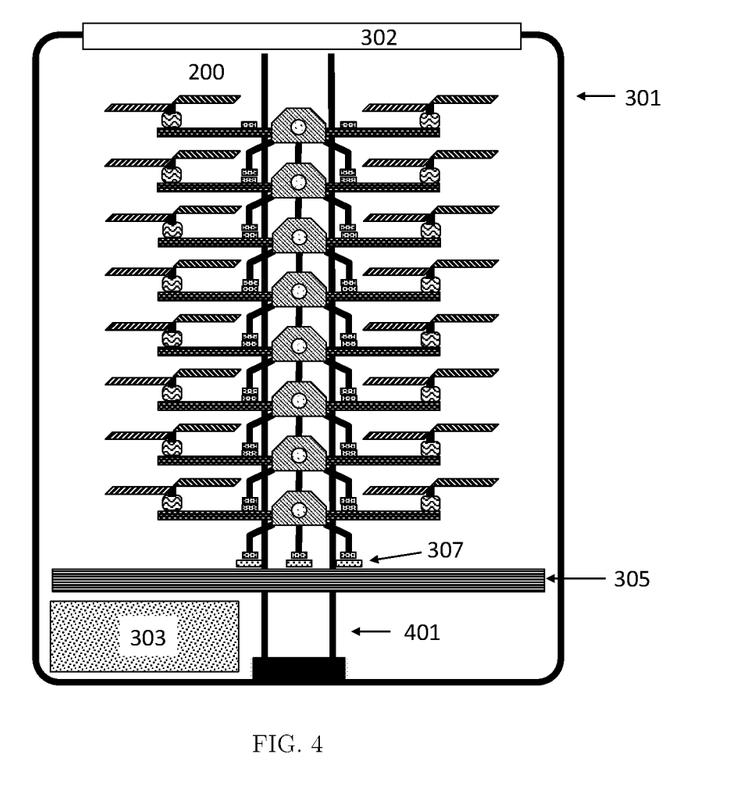
FIG. 4 Multi-drone drone launcher, alternative stack arrangement.

FIG. 4 shows an alternative cell. This cell has no elevator and drones are lifted by their power. A shaft (401) or rails are used to guide the drone on their way up.

This configuration is simpler than the previous one. However, a malfunctioning drone needs to be pushed all the way up by the drone below it, which is less favorable than the elevator configuration that can just use an electric pulse to the electromagnets to drive away a malfunctioning drone once it arrived at the door.

A conventional magazine configuration, in which a spring pushes drones and release by a sideways moving arm is possible but most likely less favorable than the above configurations.

Figure 5:
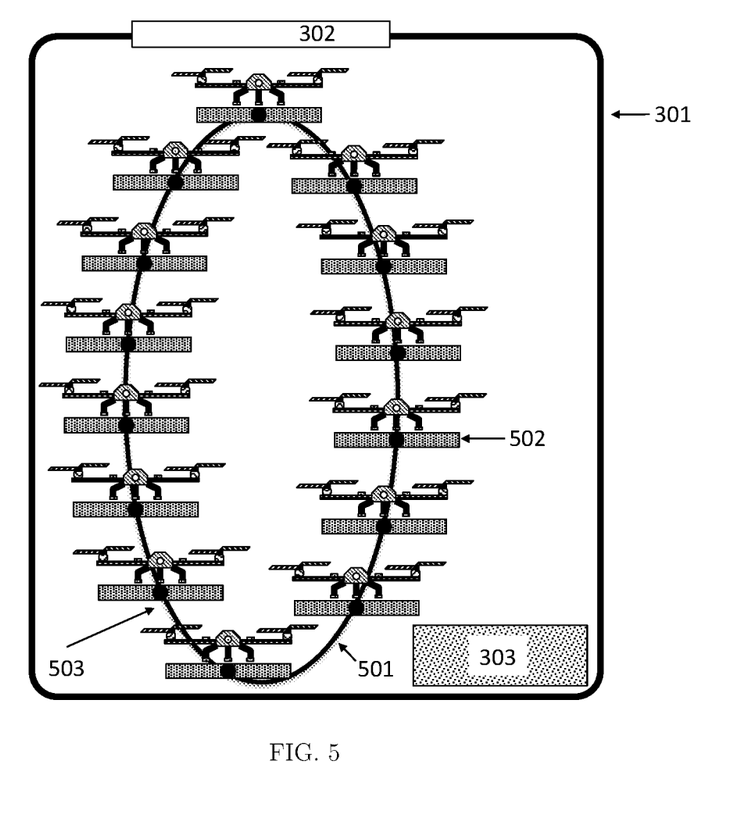
FIG. 5 Multi-drone launcher, ferris wheel arrangement.

In another realization of the invention shown in FIG. 5 drones are placed on a Ferris wheel or a conveyor belt arrangement (501) such that the wheel or the belt rotate and can bring each drone to the launch port (302), In this arrangement each drone has its base plate (502) with same bottom contacts (307) that connect the drone to the base plate. Each base plate rotates on a pivot 503 to keep each drone leveled (as any Ferris wheel does).

It is possible to use a conveyor belt or a part of a conveyor belt in which drones are placed side by side to each other.

It is possible to place a stack of two or more drones, as described above, on each pad of the Ferris wheel or conveyor belt.

In this method, Power and communication similar to the ones mentioned above are sent to each pad base plate and then through the bottom contacts (307) to the drone.

This method, while more complex and less space efficient than the stack method has several potential advantages: (i) In case of a drone malfunction, there is no need to eject (and most likely further damaging) the malfunctioning drone to allow other drones to fly. A malfunctioning drone can be just skipped, and it stays in the cell until it can be serviced. (ii) This method is capable of launching drones in any order. Thus, it is more suitable if different types of drones or drones with different types of payload or countermeasures are placed in the same cell. (iii) This method can use off the shelf drone, where the bottom contacts only secure the drone to its place, batteries are pre-charged, and communication is wireless. However, this arrangement is less robust than having wired charging and communication.

Each cell can carry a limited number of drones that are preferably identical (having different types of drones in the same cell complicated control and logistics).

However, multiple cells, containing potentially different drone types, can be clustered together to form a battery.

A battery has the following advantages: (i) Multiple drones can be launched simultaneously from different cells allowing faster deployment of drones. (ii) Different type of drones can be launched from different cells; each has a uniform type of drones. This is particularly useful when using a stack type cells. (iii) A battery can share the same power supply, communication, and control center among all cells simplifying the system.

A Battery can be carried by a vehicle or ship for mobility.

Cells can be stored with the batteries of all drones are charged at a level that is best suited for extended storage and be fully charged before use, Drone batteries can also be discharged in a controlled manner where needed. This increases the safety of the system, for example during travel.

CONCLUSION

The above description (including without limitation any attached drawings and figures) describes exemplary implementations of the invention. However, the invention may be implemented in other ways.

The methods and apparatus which are described above are merely illustrative applications of the principles of the invention.

Numerous modifications may be made by those skilled in the art without departing from the scope of the invention. Also, this invention includes without limitation each combination or sub-combination of one or more of the above-mentioned implementations, embodiment, and features.

In particular, the term "top," "bottom" "above," and "below" are used for ease of description of the example shown and do not restrict the invention solely to a vertical application. Slanted or even horizontal applications using the same principles are possible.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed:

1. A system for clearing one or more malfunctioning drones in a drone launcher comprising:
    a stack of two or more drones stacked one on top of the other, which includes said one or more malfunctioning drones,
    a launchpad, and
    a controller,
    wherein each of said two or more drones is equipped with a first set of bottom facing contacts and a second set of top facing contacts, and said launchpad is equipped with a third set of top facing contacts, wherein:
    (a) said launchpad's top facing set of contacts connects to the bottom facing set of contacts of a drone from the stack of two or more drones immediately above it to form a matching set of contacts,
    (b) each drone's top facing set of contacts connects to the bottom facing set contacts of a drone from the stack of two or more drones immediately above it, except for the drone at the top of the stack, to form additional matching sets of contacts
    (c) each matching set of contacts can physically attach, hold, release or repel each other through turning on, off, or reversing the polarity of a magnetic force;
    wherein each of said one or more malfunctioning drones when at a top most position in the stack is ejected by reversing the polarity of the magnetic force of the top facing contacts of the drone or launchpad immediately below the malfunctioning drone.

2. A system for clearing one or more malfunctioning drones in a drone launcher comprising:
    a stack of two or more drones stacked one on top of the other, which includes said one or more malfunctioning drones,
    a launchpad, and
    a controller,
    wherein each of said two or more drones is equipped with a first set of bottom facing contacts and a second set of top facing contacts, and said launchpad is equipped with a third set of top facing contacts, wherein:
    (a) each drone's top facing set of contacts connects to the bottom facing set contacts of a drone from the stack of two or more drones immediately above it, except for the drone at the top of the stack, to form matching sets of contacts
    (b) each matching set of contacts can physically attach, hold, release or repel each other through turning on, off, or reversing the polarity of a magnetic force;
    wherein each one of said one or more malfunctioning drones is pulled out by the drone immediately above it, or pushed out by the drone below it, by holding the bottom facing set of contacts of the malfunctioning drone by the top facing set of contacts of the pushing drone, or by holding the top facing set of contacts of the malfunctioning drone by the bottom facing set of contacts of the pulling drone.

* * * * *